United States Patent [19]

Arnold

[11] Patent Number: 4,540,320

[45] Date of Patent: Sep. 10, 1985

[54] SELF GENERATING PROFILE GENERATOR

[75] Inventor: Eugene E. Arnold, Puyallap, Wash.

[73] Assignee: Flow Systems, Inc., Kent, Wash.

[21] Appl. No.: 521,034

[22] Filed: Aug. 8, 1983

[51] Int. Cl.³ .......................... B23C 1/20; B23B 41/00; B26D 5/08

[52] U.S. Cl. ..................................... 409/232; 83/523; 266/70; 408/150

[58] Field of Search ............... 409/232, 218, 131, 132; 29/557, 558; 266/70, 58, 56, 72; 83/53, 177, 523; 408/150, 1

[56] References Cited

U.S. PATENT DOCUMENTS

| | | | |
|---|---|---|---|
| 2,740,621 | 4/1956 | Way | 266/72 |
| 4,319,933 | 3/1982 | Shoesmith, Jr. | 266/70 X |
| 4,411,410 | 10/1983 | Sumner | 266/70 X |
| 4,448,340 | 5/1984 | Locus et al. | 266/70 X |

FOREIGN PATENT DOCUMENTS 870486  7/1949  Fed. Rep. of Germany ...... 408/150

*Primary Examiner*—William R. Briggs
*Attorney, Agent, or Firm*—Don R. Mollick

[57] ABSTRACT

A method and apparatus for cutting holes of circular or other shape by first cutting at the center of the proposed hole, then cutting to the circumference and following the shape desired. A tool that accomplishes these functions is described which includes a pivoted link attached to a ring at one end and the cutting tool at the other end, when torque is applied to the link the tool follows the desired cutting sequence.

8 Claims, 9 Drawing Figures

SELF GENERATING PROFILE GENERATOR

BACKGROUND OF THE INVENTION

1. Field of the Invention

This invention pertains to cutting tools, particularly hole cutting tools, and with greater particularity, hole cutting tools for cutting round or irregular holes by starting the cut in the center of the hole.

2. Description of the Prior Art

Modern materials have led to the development of a variety of tools to cut such material. Such tools include: cutting torches or arcs; lasers; and water jet cutting apparatus. All of these tools are distinguished by the fact that they cut at one point and are moved during operation to cut a line or profile.

It is often desirable to cut large diameter holes or cutouts in sheets of material. If the hole is larger than the diameter of the cut made by the tool, the tool must be moved to produce the outline of the hole. Three basic methods are used presently to accomplish this movement. First, the tool may be manually moved to follow an outline on the workpiece. This method has the advantage of simplicity, but the disadvantage that high tolerance cannot be duplicated. A second method is to move the tool around a template or form. This method has the advantage of greater reproducibility at the expense of added complexity and preparation costs for the templates. The third method is to provide motor drives in the x and y directions and link the drives to a computer or robot. This method provides excellent reproducibility and flexibility at a greatly increased cost.

With the cutting tools described, it is desirable to begin cutting at the center of the hole. The initial start up of the tool can lead to an increased kerf size at the start point, in the case of lasers or torches. With water jets cutting laminated materials, the start up torch can cause a point of delamination. If the tool is started on the edge of the hole sought to be made, therefore, the hole will either be irregular or contain a deliminated portion. For the above reasons, it is desirable to begin the cut at the center or discarded portion of the hole.

Of the methods described above, only the first and last is capable of beginning at the center of the hole. Such a process could be programmed into a computer or robot at additional expense, or done by hand. It is, therefore, desirable to produce a simple method for producing holes of large size, or irregular shape by use of a cutting tool that starts the cut at the center.

SUMMARY OF THE INVENTION

The invention provides a simple mechanical means for generating movement of a tool in a circular or irregular closed pattern with a starting point in the center of the pattern. The tool may produce irregular or circular cut-outs of variable size. The invention will either accept pre-formed patterns, or can generate the curve by internal adjustment. Means may optionally be provided to return the tool to the center when cutting is completed. The invention is usable with torch, laser, water jet, or similar cutting tools. The above functions are accomplished with a minimal number of moving parts.

The invention incorporates a rotatible ring having a pivot point on its periphery. The ring may be housed in a housing that allows rotation of the ring relative to the housing. Means may be optionally provided to brake the rotation of the ring. A link is attached to the pivot point in such a manner that the link may pivot about such points. The cutting tool is attached to the link at a point removed from the pivot point. The tool may be attached to the link in a manner that allows rotation of the tool relative to the link. Finally, means are provided to apply a torque to the link in a manner as to cause the link to rotate on an axis that is between the points of attachment of the tool and the pivot.

To operate, the tool is started beginning a cut at the center of the desired hole. Torque is then applied to the link. The torque causes the link to pivot on the pivot point and pull the tool to the periphery of the hole. Since the pivotal movement of the link is limited, further application of torque results in rotation of the ring. The link and tool rotate with the ring and cut the outline of the hole. When the hole is complete, the torque may be reversed to return the tool to center, or, a spring may return the tool to center.

In one embodiment shown the stop of the links movement is adjustable to allow production of different sized circles. A second embodiment used readily interchangeable dies to limit the tools movement to produce irregular or various sized circular holes. The two methods may also be combined in one device to allow internal generation of holes or use of dies.

DESCRIPTION OF THE PREFERRED EMBODIMENT

Figure 1:
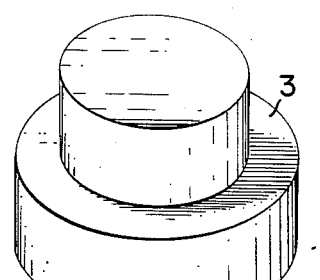
FIG. 1 is a section perspective view of one embodiment of the invention.

FIG. 1 is a sectional perspective view of one embodiment of the invention. The invention is shown as used on a water jet cutter, but it is realized that other cutters could be substituted; such as; lasers, cutting torches, or routers.

A cutting nozzle 1 is connected to an on-off valve 3 by supply tube 2. On-off valve 3 is connected to a source of high pressure fluid (not shown). Supply tube 2 is rotatably mounted to an upper link 4, and a lower link 5 by bearings 6. Bearings 6 could be either sleeve roller or equivalent bearings, dependent upon the duty cycle and temperatures of operation. The end of links 4 and 5, not connected to supply tube 2, is pivotly mounted by pivot pin 8 to ring 9. At a position intermediate to pivot pin 8 and supply tube 2, a means 7 for imputing a torque is attached to upper link 4. Means 7 could be a flexible shaft connected to a motor (not shown). Ring 9 is rotatably mounted to a housing 12. A journal bearing 11 is positioned between ring 9 and housing 12. An adjustment screw 13 is attached to housing 13 to bear on bearing 11, and ring 9, to vary the force necessary to turn ring 9 relative to housing 12. A stop 14 is attached to ring 9, also. A second adjustment screw 16 is attached to a projection on ring 9 on a level equal to that of the upper link 4. Finally, a bearing 17 is attached to the lower circumference of housing 12. Bearing 17 may be a ring of florocarbon polymer.

Figure 2:
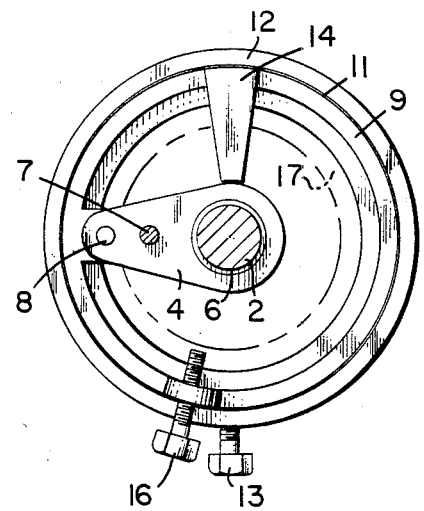
FIG. 2 is a section plan view of the FIG. 1 embodiment through 2—2.

FIG. 2 is a plan view of the FIG. 1 embodiment. Housing 12 is seen to be circular, with bearings 11 mounted on its interior surface, thus, rotatably mounting ring 9. Also, mounted to a housing 12 is a stop 14 and friction adjustment 13. Friction adjustment 13 is adjusted so that the force required to rotate ring 9 relative to housing 12 is greater than that required to pivot link 7 on pivot 8 attached to ring 9. The position of the point of application of torque 7 to link 4 is shown as between pivot 8 and bearing 6, which mounts to tool 2. The position of adjustment screw 16 which determines the size of the hole cut is shown more clearly. Finally, bearing 17 is shown as the surface closest to tool 2. Bearing 17 is shown as circular in this view, but it is realized that it may be other shapes for cutting different shaped holes.

Figure 3:
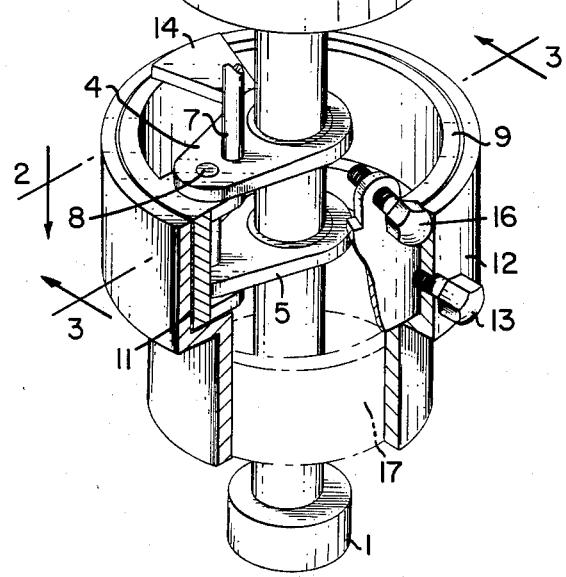
FIG. 3 is a section elevation view of the FIG. 1 embodiment through 3—3.
Figure 3:
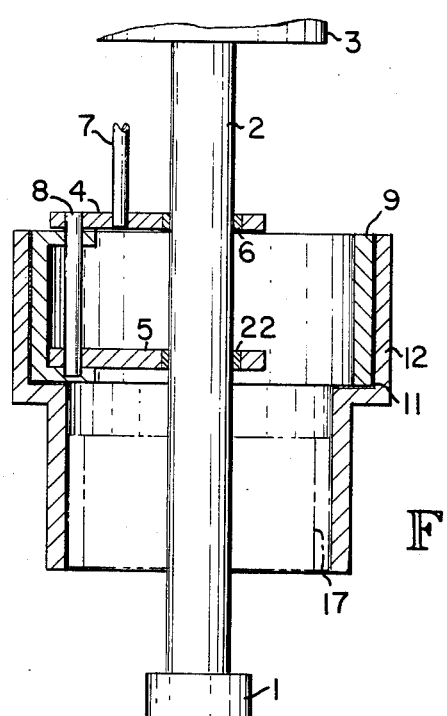

FIG. 3 is a section elevation view of the Figure embodiment. Link 4 is seen to be the uppermost of two links 4,5, which are mounted by a single pivot pin 8 to ring 9, which in turn is rotatably mounted to housing 12 by bearing 11. The torque attachment point 7 joins only to link 4, otherwise links 4,5, are identical.

Figure 4:
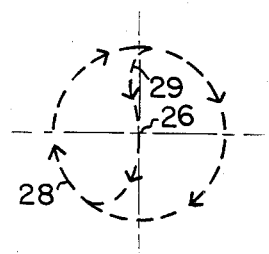
FIG. 4 is a diagram of the pattern produced by the invention.

FIG. 4 is a diagram showing motion of a tool caused by the invention. FIG. 4 will be explained in conjunction with FIG. 2 to clarify operation. To start, cutting tool 2 is in position 26 at the center of the apparatus. The tool is started, and a small hole cut at point 26. Torque is now applied to point 7 in a clockwise direction. As the direction of easiest movement is around pivot 8, tool 2 swings along an arc 27. This causes the cutting of an arc 27. Motion is stopped in this direction when the outer edge of link 4 contacts adjustment screw 16. The closer the end of screw 16 is to link 4, the smaller the hole cut will be. As there can be no further pivotal motion around 8, further application of torque around point 7 will cause rotation of ring 9 relative to housing 12. This motion caused tool 2 to move in a circular path 28 until torque is ceased. In the case shown after 1½ turns, the torque is reversed and applied in a counter clockwise direction. This will cause link 4 to swing around pivot 8, forcing tool 2 to return to center along arc 29. Stop 14 will also force return to center. As an alternative, tool 2 can be spring loaded to return to center when torque 7 is stopped. Finally, bearing 17 can be contoured to form holes of other than circular outline, as tool 2 will follow bearing 17's profile, if adjustment screw 16 is removed.

Figure 5:
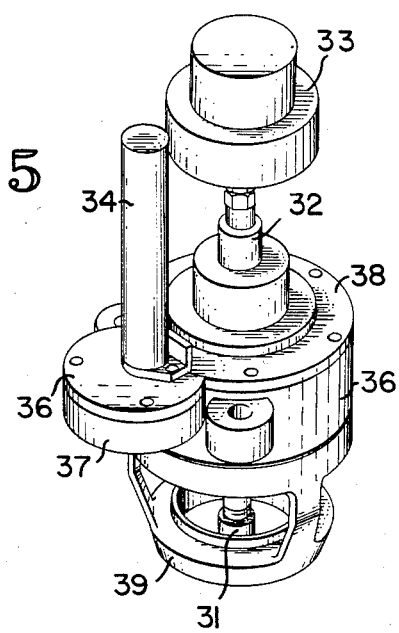
FIG. 5 is a perspective view of a second embodiment of the invention.

FIG. 5 is a perspective view of a second embodiment of the invention. The invention is shown with a water jet cutting apparatus as a tool, but it is realized that a laser, or flame cutting apparatus, could be substituted.

As in the FIG. 1 embodiment, the FIG. 5 embodiment uses a cutting nozzle connected to a supply tube 32 controlled by a shut off valve 33. The apparatus is contained in a housing 36, closed by a top plate 38, and a shield 39 below. A motor 34 is mounted to top plate 38 to provide a source of torque. An extension 37 of housing 36 provides a covering for the pinion attached to motor 34. Motor 34 may be an electric, hydraulic, or pneumatic motor in different environments.

Figure 6:
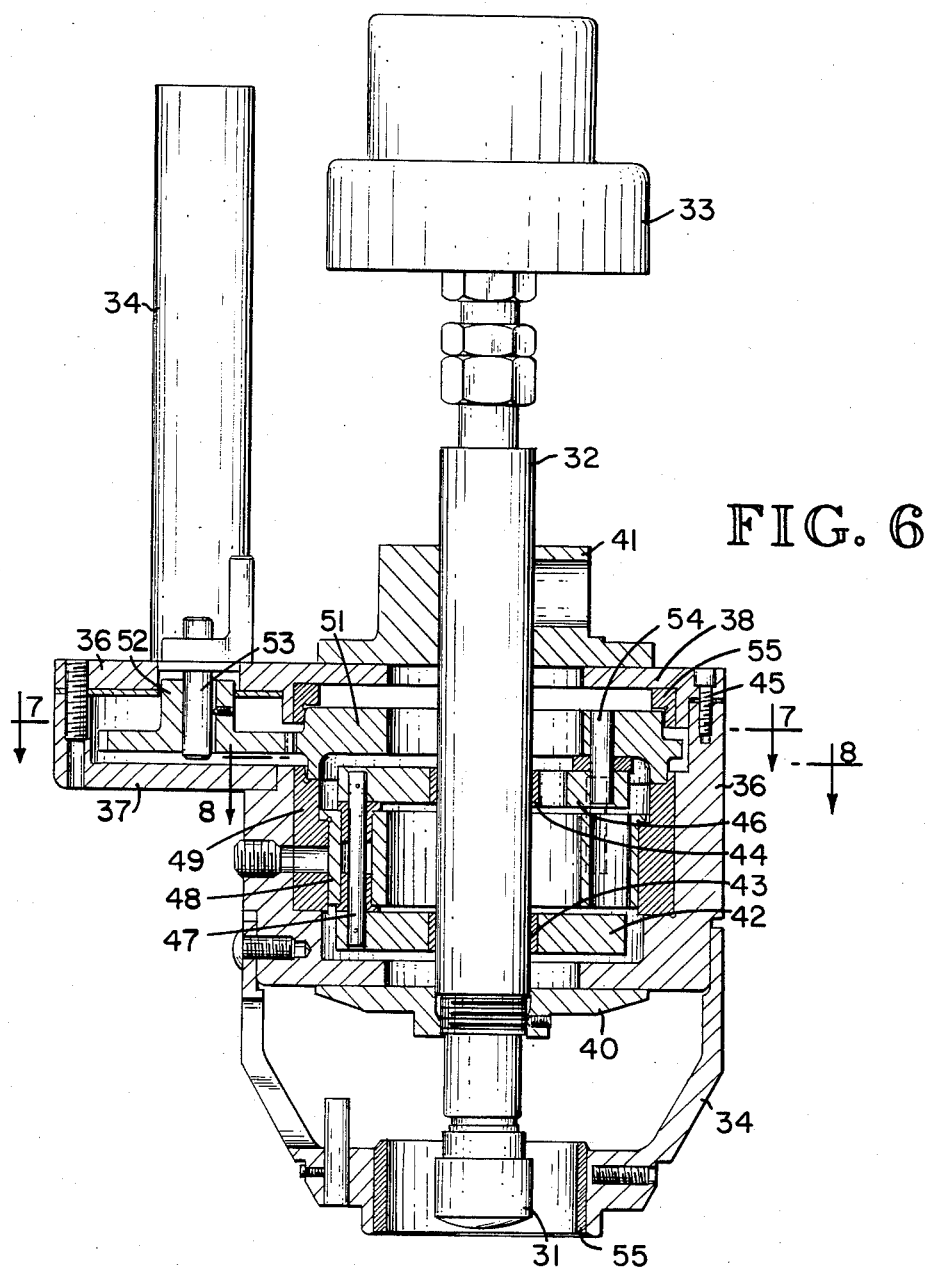
FIG. 6 is a section elevation view of the FIG. 5 embodiment.

FIG. 6 is a sectional elevation view of the FIG. 5 embodiment. The tool shown is a water jet cutter, but the invention is equally adaptable to other cutters.

The cutter is controlled by an actuator 33 attached to supply tube 32, which ends in a nozzle 31. A mounting 41 and clamp ring 40 are attached to supply tube 32. Supply tube 32 is also rotatably attached to an upper link 46 and a lower link 42 by bearings 44, and, 43, respectively. Mounting 41 and clamp ring 40 are slidably attached to the housing top plate 38 and housing 36, respectively, to prevent the entry of cuttings, or other debris, into the mechanism. The top plate 38 is mounted to the housing 36 by a plurality of screws 45 to seal the interior. Mounted to top plate 38, also, is the drive motor 34. The shaft 53 of motor 34 has a pinion 52 attached by a set screw in this embodiment. It is recognized that other equivalent attachment means, such as, keys, etc., could be used. Pinion 52 is housed in an extension 37 of housing 36. Meshing with pinion 52 is a drive ring 51. Drive ring 51 is supported by a top bearing attached to top plate 38, and the main bearing 49 is attached to housing 36. Drive ring 51 is thus free to rotate in response to torque from pinion 52. A pin 54 connects drive ring 51 to a slot in top link 46. Top link 46 includes a bearing 44 allowing rotation relative to feed tube 37. A pivot pin connects top link 46 to a drive wheel 48 and a bottom link 42 in a manner similar to that of the FIG. 1 embodiment. Drive wheel 48 is rotatably supported by main bearing 49. Lower link 42 is similar to top link 46 in having a bearing 43 for allowing rotation relative to feed tube 37. A shield 39 prevents the operator from coming in contact with the cutting apparatus, and provides a mounting for a guide bearing 55. Guide bearing determines the size and shape of the hole cut.

Figure 7:
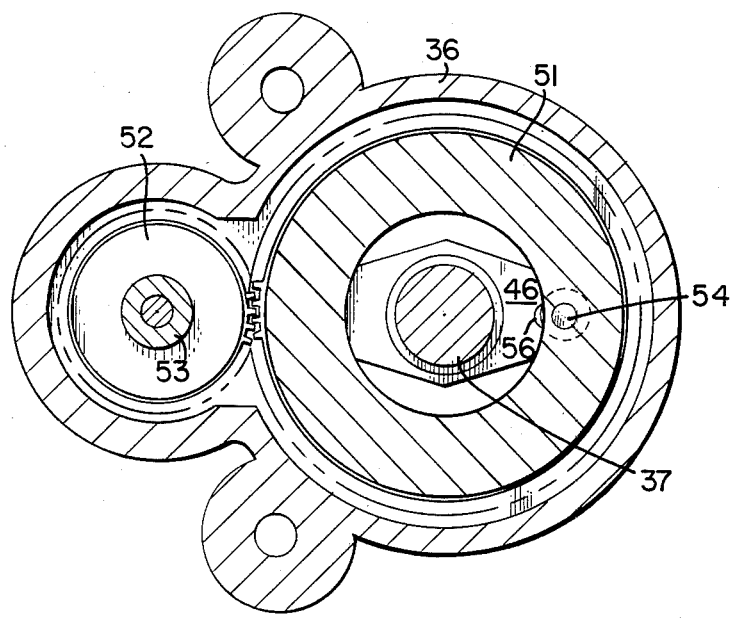
FIG. 7 is a section plan view of the FIG. 5 embodiment.

FIG. 7 is a plan sectional view of the FIG. 6 embodiment with a portion of pinion and drive ring teeth shown for clarity. The main difference from the FIG. 1 embodiment is the method of applying torque to link 37. As motor shaft 53 turns, pinion 52 connected to shaft 53, is also turned. Pinion 52's motion, in turn, causes rotation of drive ring 51 in the opposite direction. Pin 54, connecting drive ring 51 and a slot 56 in link 46, will transfer the motion, placing a torque on link 46, which results in motion of feed tube 37 and the cutting nozzle. Housing 36 provides support and protection for the apparatus.

Figure 8:
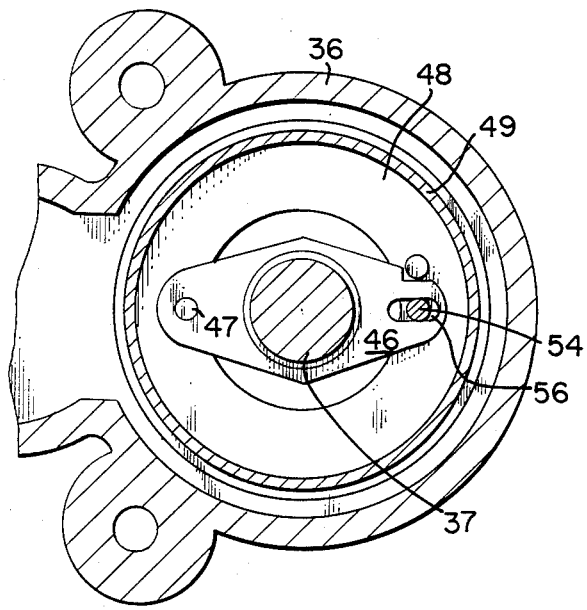
FIG. 8 is a section plan view of FIG. 5 embodiment with the ring gear removed in starting position.
Figure 9:
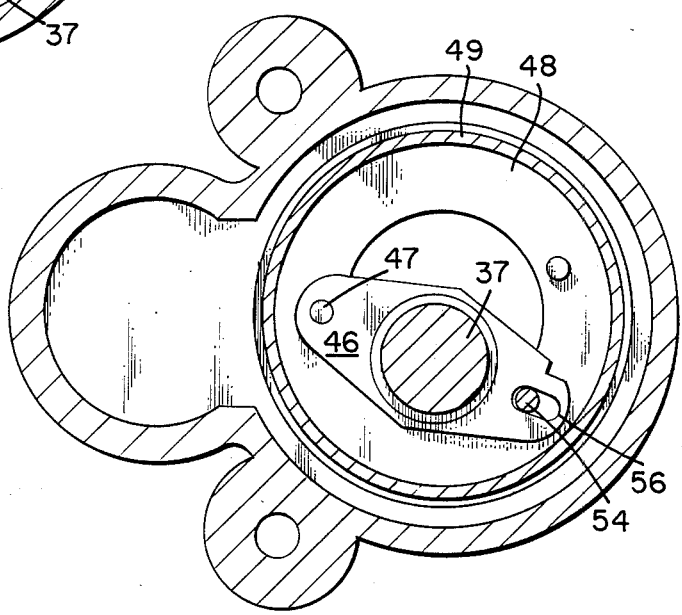
FIG. 9 is a section plan view of the FIG. 5 embodiment with the ring gear removed in circumference cutting position.

FIG. 8 is a plan section view of the FIG. 6 embodiment below the drive ring in starting position. Drive wheel 48 is seen to rest in main bearing 49 and top link 46 pivoted to drive wheel 48 by pivot pin 46. The amount of force needed to pivot links 46 and 42 relative to drive wheel 48, is less than that required to rotate drive wheel 48 relative to housing 36. In this position, the cutting tool is started, then torque is applied to pin 54 as described above. This torque is transferred through slot 56 to link 46, causing link 46 to pivot on pivot 47, into the position shown in FIG. 9. The pivoting motion is stopped when nozzle 31 impacts guide 55. Furthr application of torque causes rotation of drive wheel 48 relative to housing 48. This motion caused movement of a tool in the pattern shown in FIG. 4. To return to center, either the direction of torque may be reversed, or a spring employed.

I claim:

1. An apparatus for cutting a hole comprising a housing; and, a ring rotatably mounted in said housing, and a link pivotably mounted to said ring at one end and rotatably mounted to a cutting tool at its other end, and means for applying torque to said link.

2. An apparatus as in claim 1 wherein said means for applying torque is a flexible drive attached to said link.

3. An apparatus as in claim 1 wherein said cutting tool is a high velocity water jet.

4. An apparatus as in claim 1 wherein said means for applying torque further comprises;

a second ring rotatively mounted in said housing a pin connected to said second ring for transferring torque to said link, and means for rotating said second ring.

5. An apparatus as in claim 4 wherein said means for rotating said link is a pneumatic motor.

6. An apparatus as in claim 4 wherein said second ring is provided with teeth for engagement with meshing teeth on said means for rotating said link.

7. An apparatus as in claim 1 further comprising guide means attached to said tool for making said tool follow the circumference of said hole.

8. An apparatus as in claim 7 wherein said guide means is a member having an inner surface in the shape of the hole desired to be cut.

* * * * *